(12) United States Patent
Shen

(10) Patent No.: US 11,212,431 B2
(45) Date of Patent: Dec. 28, 2021

(54) METHODS AND APPARATUS FOR REMOTELY CONTROLLING A CAMERA IN AN ENVIRONMENT WITH COMMUNICATION LATENCY

(71) Applicant: TVU Networks Corporation, Mountain View, CA (US)

(72) Inventor: Paul Shen, Woodside, CA (US)

(73) Assignee: TVU Networks Corporation, Mountain View, CA (US)

( * ) Notice: Subject to any disclaimer, the term of this patent is extended or adjusted under 35 U.S.C. 154(b) by 0 days.

(21) Appl. No.: 16/369,062

(22) Filed: Mar. 29, 2019

(65) Prior Publication Data

US 2019/0313006 A1    Oct. 10, 2019

Related U.S. Application Data

(60) Provisional application No. 62/653,613, filed on Apr. 6, 2018.

(51) Int. Cl.
*H04N 5/232* (2006.01)
*H04N 5/268* (2006.01)

(52) U.S. Cl.
CPC ..... *H04N 5/23206* (2013.01); *H04N 5/23216* (2013.01); *H04N 5/232935* (2018.08); *H04N 5/268* (2013.01)

(58) Field of Classification Search
None
See application file for complete search history.

(56) References Cited

U.S. PATENT DOCUMENTS

| 5,510,848 | A | 4/1996 | Nocture et al. |
| 5,991,799 | A | 11/1999 | Yen et al. |
| 6,208,691 | B1 | 3/2001 | Balakrishnan et al. |
| 7,299,275 | B2 | 11/2007 | Tsukidate et al. |
| 7,369,749 | B2 | 5/2008 | Ichioka et al. |
| 7,603,683 | B2 | 10/2009 | Reto |
| 7,653,921 | B2 | 1/2010 | Herley |
| 7,712,125 | B2 | 5/2010 | Herigstad et al. |
| 7,734,579 | B2 | 6/2010 | White et al. |
| 7,817,186 | B2 * | 10/2010 | Tamamura ......... H04N 5/23232 348/208.12 |
| RE41,968 | E | 11/2010 | Washino et al. |

(Continued)

FOREIGN PATENT DOCUMENTS

| CN | 105100829 | 11/2015 |
| CN | 105684414 | 6/2016 |

(Continued)

*Primary Examiner* — Cynthia Segura
(74) *Attorney, Agent, or Firm* — Lipsitz & McAllister, LLC

(57) ABSTRACT

Methods, apparatus, and systems are provided for remotely controlling a camera in an environment where there is a delay. A control device is provided for controlling a remotely located camera via a network. The control device comprises a monitor for viewing an image provided by the camera. A control signal is sent from the control device to the camera with a command for controlling at least one of a function, setting, or parameter of the camera. An image displayed on the monitor of the control device is modified in accordance with the command to provide an emulated image for display prior to execution of the command at the camera.

22 Claims, 4 Drawing Sheets

19 (Full image of the camera sensor captures 12MP 4240x2832)

20
(What is streamed and displayed on the monitor, 1080i 1920x1080
Portion will remain black, since there is no data)

Pan to right (during emulation period)

(56) References Cited

U.S. PATENT DOCUMENTS

| | | |
|---|---|---|
| 7,908,625 B2 | 3/2011 | Robertson et al. |
| 8,151,301 B2 | 4/2012 | Bennett |
| 8,184,168 B2 * | 5/2012 | Kindborg ......... G08B 13/19671 348/211.11 |
| 8,307,395 B2 | 11/2012 | Issa et al. |
| 8,490,133 B1 | 7/2013 | Parekh et al. |
| 8,516,345 B2 | 8/2013 | Quere et al. |
| 8,621,508 B2 | 12/2013 | Rowe et al. |
| 8,631,452 B2 | 1/2014 | Xu et al. |
| 8,713,195 B2 | 4/2014 | Pickens et al. |
| 8,806,563 B2 | 8/2014 | Coufal et al. |
| 8,839,295 B2 | 9/2014 | Kim |
| 8,881,220 B2 | 11/2014 | Arya et al. |
| 9,226,022 B2 | 12/2015 | Ferguson |
| 10,021,433 B1 | 7/2018 | Hundemer et al. |
| 10,270,959 B1 * | 4/2019 | Bart .................. H04N 5/23206 |
| 2002/0054244 A1 | 5/2002 | Holtz et al. |
| 2002/0057348 A1 | 5/2002 | Miura et al. |
| 2003/0061206 A1 | 3/2003 | Qian |
| 2003/0063213 A1 * | 4/2003 | Poplin ................ H04N 5/232 348/362 |
| 2003/0063217 A1 | 4/2003 | Smith |
| 2004/0103426 A1 | 5/2004 | Ludvig et al. |
| 2004/0148571 A1 | 7/2004 | Lue |
| 2004/0215718 A1 | 10/2004 | Kazmi et al. |
| 2005/0144455 A1 | 6/2005 | Haitsma |
| 2005/0262542 A1 | 11/2005 | DeWeese et al. |
| 2006/0031883 A1 | 2/2006 | Ellis et al. |
| 2006/0031889 A1 | 2/2006 | Bennett et al. |
| 2006/0055785 A1 * | 3/2006 | Nagajima ......... H04N 1/32128 348/207.99 |
| 2006/0190966 A1 | 8/2006 | McKissick et al. |
| 2007/0124756 A1 | 5/2007 | Covell et al. |
| 2007/0157281 A1 | 7/2007 | Ellis et al. |
| 2007/0204285 A1 | 8/2007 | Louw |
| 2008/0027953 A1 | 1/2008 | Morita et al. |
| 2008/0059532 A1 | 3/2008 | Kazmi et al. |
| 2008/0060036 A1 | 3/2008 | Cox |
| 2008/0077568 A1 | 3/2008 | Ott |
| 2008/0170630 A1 | 7/2008 | Falik et al. |
| 2008/0215170 A1 | 9/2008 | Milbrandt et al. |
| 2008/0235733 A1 | 9/2008 | Heie et al. |
| 2009/0037954 A1 | 2/2009 | Nagano |
| 2009/0119708 A1 | 5/2009 | Harrar et al. |
| 2009/0179982 A1 * | 7/2009 | Yanagisawa ........... H04N 7/147 348/14.1 |
| 2009/0183201 A1 | 7/2009 | Dasgupta |
| 2009/0237548 A1 * | 9/2009 | Watanabe ................ G03B 7/00 348/333.02 |
| 2009/0320058 A1 | 12/2009 | Wehmeyer et al. |
| 2009/0320060 A1 | 12/2009 | Barrett |
| 2009/0320072 A1 | 12/2009 | McClanahan et al. |
| 2009/0320073 A1 | 12/2009 | Reisman |
| 2009/0328085 A1 | 12/2009 | Beyabani et al. |
| 2010/0050203 A1 | 2/2010 | Yamagishi |
| 2010/0121936 A1 | 5/2010 | Liu et al. |
| 2010/0131385 A1 | 5/2010 | Harrang et al. |
| 2010/0157020 A1 * | 6/2010 | Choi .................. H04N 21/4223 348/47 |
| 2010/0251292 A1 | 9/2010 | Srinivasan et al. |
| 2010/0296487 A1 | 11/2010 | Karaoguz et al. |
| 2010/0333148 A1 | 12/2010 | Musha et al. |
| 2011/0066744 A1 | 3/2011 | Del Sordo et al. |
| 2011/0068899 A1 | 3/2011 | Ioffe et al. |
| 2011/0086619 A1 | 4/2011 | George et al. |
| 2011/0138064 A1 | 6/2011 | Rieger et al. |
| 2011/0179462 A1 | 7/2011 | Kubo et al. |
| 2011/0191439 A1 | 8/2011 | Dazzi et al. |
| 2011/0191446 A1 | 8/2011 | Dazzi et al. |
| 2012/0110614 A1 | 5/2012 | Whitley |
| 2012/0117590 A1 | 5/2012 | Agnihotri et al. |
| 2012/0144435 A1 | 6/2012 | Spilo et al. |
| 2012/0278725 A1 | 11/2012 | Gordon et al. |
| 2012/0291079 A1 | 11/2012 | Gordon et al. |
| 2012/0307052 A1 * | 12/2012 | Thiruvengada .... H04N 5/23216 348/143 |
| 2012/0307082 A1 * | 12/2012 | Thiruvengada .... H04N 5/23206 348/207.99 |
| 2013/0128074 A1 * | 5/2013 | Mitsugi .................... H04N 5/57 348/223.1 |
| 2013/0155182 A1 | 6/2013 | Bekiares et al. |
| 2013/0268962 A1 | 10/2013 | Snider et al. |
| 2013/0268973 A1 | 10/2013 | Archibong et al. |
| 2014/0067828 A1 | 3/2014 | Archibong et al. |
| 2014/0092254 A1 | 4/2014 | Mughal et al. |
| 2014/0125703 A1 | 5/2014 | Roveta et al. |
| 2014/0250484 A1 * | 9/2014 | Duennebier ....... H04N 21/8547 725/118 |
| 2014/0280564 A1 | 9/2014 | Darling et al. |
| 2015/0022674 A1 | 1/2015 | Blair et al. |
| 2015/0039608 A1 | 2/2015 | Basilico |
| 2015/0082203 A1 | 3/2015 | James et al. |
| 2015/0100586 A1 | 4/2015 | Caruso |
| 2015/0113576 A1 | 4/2015 | Carroll |
| 2015/0128179 A1 | 5/2015 | Cormican et al. |
| 2015/0286716 A1 | 10/2015 | Snibbe et al. |
| 2015/0304689 A1 | 10/2015 | Warren |
| 2015/0378000 A1 | 12/2015 | David et al. |
| 2016/0057477 A1 | 2/2016 | Finkelstein |
| 2016/0112741 A1 | 4/2016 | Elm et al. |
| 2016/0182785 A1 * | 6/2016 | Ogata ................ H04N 5/23203 348/311 |
| 2016/0366228 A1 | 12/2016 | Overton et al. |
| 2016/0381276 A1 * | 12/2016 | Li ...................... H04N 5/23206 348/211.3 |
| 2017/0070659 A1 * | 3/2017 | Kievsky ............. H04N 5/23216 |
| 2017/0127150 A1 | 5/2017 | Kuo et al. |
| 2017/0295309 A1 * | 10/2017 | Cabral .................. H04N 5/2352 |
| 2017/0303005 A1 | 10/2017 | Shen et al. |
| 2018/0088444 A1 * | 3/2018 | Matsumoto ........ H04N 5/23245 |
| 2019/0313163 A1 * | 10/2019 | Shen ................ H04N 21/41407 |
| 2020/0013432 A1 * | 1/2020 | Doi .......................... H04N 7/18 |

FOREIGN PATENT DOCUMENTS

| | | |
|---|---|---|
| WO | 2015148634 | 10/2015 |
| WO | 2016202889 | 12/2016 |

\* cited by examiner

METHODS AND APPARATUS FOR REMOTELY CONTROLLING A CAMERA IN AN ENVIRONMENT WITH COMMUNICATION LATENCY

This application claims the benefit of U.S. Provisional Application No. 62/653,613 filed on Apr. 6, 2018, which is incorporated herein and made a part hereof by reference for all purposes.

BACKGROUND OF THE INVENTION

The present invention relates to the field of digital video recording. More specifically, the present invention relates to the remote control of a camera (or other video recording device) in an environment where communication latency is present between the camera and a monitor at the control site.

Quite often there is a need to control a camera function, setting, or parameter, such as pan, tilt, zoom, brightness, contrast, white balance, and other functions, settings, and parameters from a remote location and device. For example, a camera may be controlled from a remotely located control device (e.g., an Internet enabled device running a web browser or control application) which has a monitor for viewing the camera image. With such a control device, the user may be enabled to remotely view the camera image on the monitor and control the camera from the control device, such that the corresponding changes to the image provided by the camera can be viewed on the monitor. In an environment in which a communication latency between the camera and control device is low, the user can see a quick response (image change) on the monitor at the remotely located control site.

However, when the communication between the remotely located control device and camera is slow, the response to the control signal on the image viewable on the monitor of the control device is no longer instant. This latency makes camera adjustments very difficult.

It would be advantageous to account for latencies in communication between the camera and the control device such that disadvantages associated with delays in observing camera responses to control signals at the monitor of the control device can be overcome or minimized.

The methods and apparatus of the present invention provide the foregoing and other advantages.

SUMMARY OF THE INVENTION

The present invention relates to the remote control of a camera or other video recording device in an environment where communication latency is present between the camera and a monitor at the control site.

In one example embodiment of a method for remotely controlling a camera in an environment where there is a delay, a control device is provided for controlling a remotely located camera via a network. The control device comprises a monitor for viewing an image provided by the camera. A control signal is sent from the control device to the camera with a command for controlling at least one of a function, setting, or parameter of the camera. An image displayed on the monitor of the control device is modified in accordance with the command to provide an emulated image for display prior to execution of the command at the camera.

The emulated image may be seamlessly replaced with the actual image from the camera once the command is executed and the actual image is received at the control device.

The method may further comprise embedding an indicator in an image signal provided by the camera to the control device after execution of the command, such that the monitor switches to the actual image upon receipt of the indicator.

Alternatively, a time code may be provided for the command in the control signal. The time code may be embedded in an image frame upon execution of the command by the camera. Then, the emulated image can be replaced with the actual image upon receipt of the image frame with the time code at the control device.

Each of the image and the emulated image may comprise one of a still image or a video image.

The at least one of a function, setting, or parameter of the camera may comprise at least one of pan, tilt, zoom, brightness, contrast, white balance, and the like.

The camera may comprise one of a PTZ camera, a security camera, a smart phone camera, an IP camera, or the like.

The control device may comprise one of a dedicated hardware device, a software application running on one of a computer, a laptop computer, a tablet computer, a smart phone and an Internet enabled device, a web page running on a web browser, or the like.

Further control signals may be provided from the control device to the camera based on the emulated image.

A sensor size of the camera may be higher than a video resolution of the image.

The command may be specific to a camera type of the camera. The command may be converted into a camera-specific command based on an emulation model assigned to the camera. The camera specific command may be applied to a live video signal received from the camera at the monitor in accordance with the emulation model. The camera-specific command may be sent from the control device to the camera once a user has completed adjusting the function, setting, or parameter of the camera.

The present invention also encompasses apparatus and systems for remotely controlling a camera in an environment where there is a delay. An example embodiment of such a system in accordance with the present invention may comprise a network, a remotely located camera, and a control device for controlling the remotely located camera via the network. The control device may comprise a monitor for viewing an image provided by the camera. The control device is adapted to send a control signal to the camera with a command for controlling at least one of a function, setting, or parameter of the camera. The control device modifies an image displayed on the monitor in accordance with the command to provide an emulated image for display prior to execution of the command at the camera.

The systems and apparatus of the present invention may also include various features of the method embodiments discussed above.

BRIEF DESCRIPTION OF THE DRAWINGS

The present invention will hereinafter be described in conjunction with the appended drawing figures, wherein like reference numerals denote like elements, and.

DETAILED DESCRIPTION

The ensuing detailed description provides exemplary embodiments only, and is not intended to limit the scope, applicability, or configuration of the invention. Rather, the ensuing detailed description of the exemplary embodiments will provide those skilled in the art with an enabling description for implementing an embodiment of the invention. It should be understood that various changes may be made in the function and arrangement of elements without departing from the spirit and scope of the invention as set forth in the appended claims.

Figure 1:
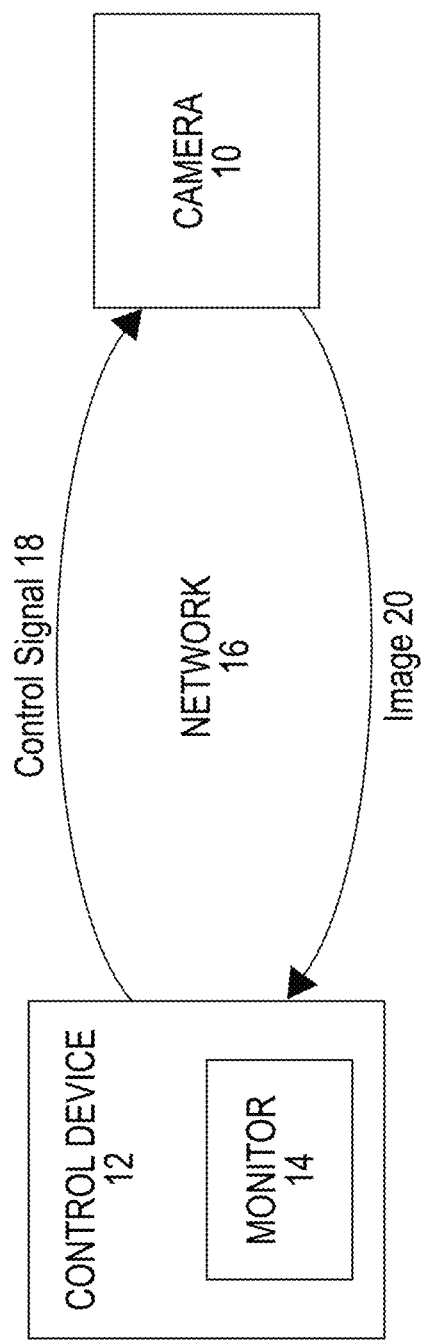
FIG. 1 shows a block diagram of an example embodiment of the present invention.

The present invention relates to the remote control of video recording in an environment where communication latency is present between the camera and a monitor at the control site. An example embodiment of the present invention is illustrated in FIG. 1.

A camera 10 is provided that may be controlled remotely from a control device 12. The camera 10 may comprise a high end PTZ (Pan, Tilt, Zoom) camera, a low-cost security camera, a smartphone camera, an IP camera, or the like.

The control device 12 is a device which may be remote from the camera 10 and adapted to control various aspects of the camera's functions, settings, and parameters such as pan, tilt, zoom, brightness, contrast, white balance, and other functions, settings, and parameters. The control device 12 may comprise a user interface for inputting commands for controlling the camera 10. The control device 12 may comprise a high end dedicated control device (i.e., a specific hardware component designed for remotely controlling a specific camera), a software application running on a computer device (e.g., a desktop computer, a laptop computer, a tablet computer, a smartphone, or other Internet enabled device), or a web page which the user accesses via a web browser on an Internet enabled device.

A monitor 14 may be provided on the control device 12 (or otherwise associated therewith or connected thereto) for viewing an image provided by the camera 10 (e.g., via image signal 20).

The control device 12 may be adapted to communicate with the camera 10 via a wired or wireless network 16. The network 16 may comprise one or more of a wide area network, a local area network, a radio frequency network, a cellular network, the Internet, Bluetooth, or the like. The user is enabled to view the camera image on a monitor 14 of the control device 12. The control device 12 enables the user to remotely control the camera 10 by sending a control signal 18 to the camera 10 over the network 16. The control signal may comprise a command for controlling at least one of a function, setting, or parameter of the camera 10. The changes brought about on the camera 12 by the control signal 18 can then be observed on the monitor 14 of the control device 12.

In circumstances where there is a delay in the communication of the image signal 20 between the camera 10 and the control device 12 after a control signal 18 has been sent, the user is unable to immediately see the changes to the camera image upon receipt of the control signal 18. Further adjustments to the camera 10 and the image provided thereby become difficult due to such latency.

To avoid such problems, with the present invention, the command that is sent in the control signal 18 is also provided to the monitor 14 of the control device 12. The control device 12 will modify the image being displayed on the monitor 14 in accordance with the command, emulating how the camera 10 will behave. In particular, the monitor 14 will use the command to emulate the image to be provided by the camera 10 in response to the control signal 18, before the actual control signal 18 reaches the camera 10 and the resultant image signal 20 is returned to the control device 12. This way the user can precisely control all the functions, settings, and parameters of the camera 10 without delay. Once the command is executed at the camera 10 and the actual image signal 20 arrives with actual result requested by the control signal 18, the monitor 14 of the control device 12 will seamlessly switch from the emulated image to the actual image being received from the camera 10.

With the present invention, the emulated image is generated by the monitor 14 and/or the control device 12 by applying the same command contained in the control signal, carrying out the command effects on the current image from the camera 10 which has not yet been affected by the control signal 18. For example, the command sent in the control signal 18 may require the camera 10 to increase its brightness setting. Due to latency in the communication network between the camera 10 and the control device 12, the image being displayed on the monitor 14 of the control device 12 would not immediately display with an increased brightness. However, since the same command is also used to modify the current image being displayed on the monitor 14 so that it emulates the image at the camera 10, the user can immediately see the effects of the control signal 18 on the image, and proceed to make further desired changes to the camera functions, settings, or parameters by providing further control signals/commands to the camera based on the emulated image shown on the monitor 14.

Those skilled in the art will appreciate that the camera 10 may produce either video or still images to be displayed by the monitor 14, and that the term "image" as used herein encompasses both still images and video.

Figure 2:
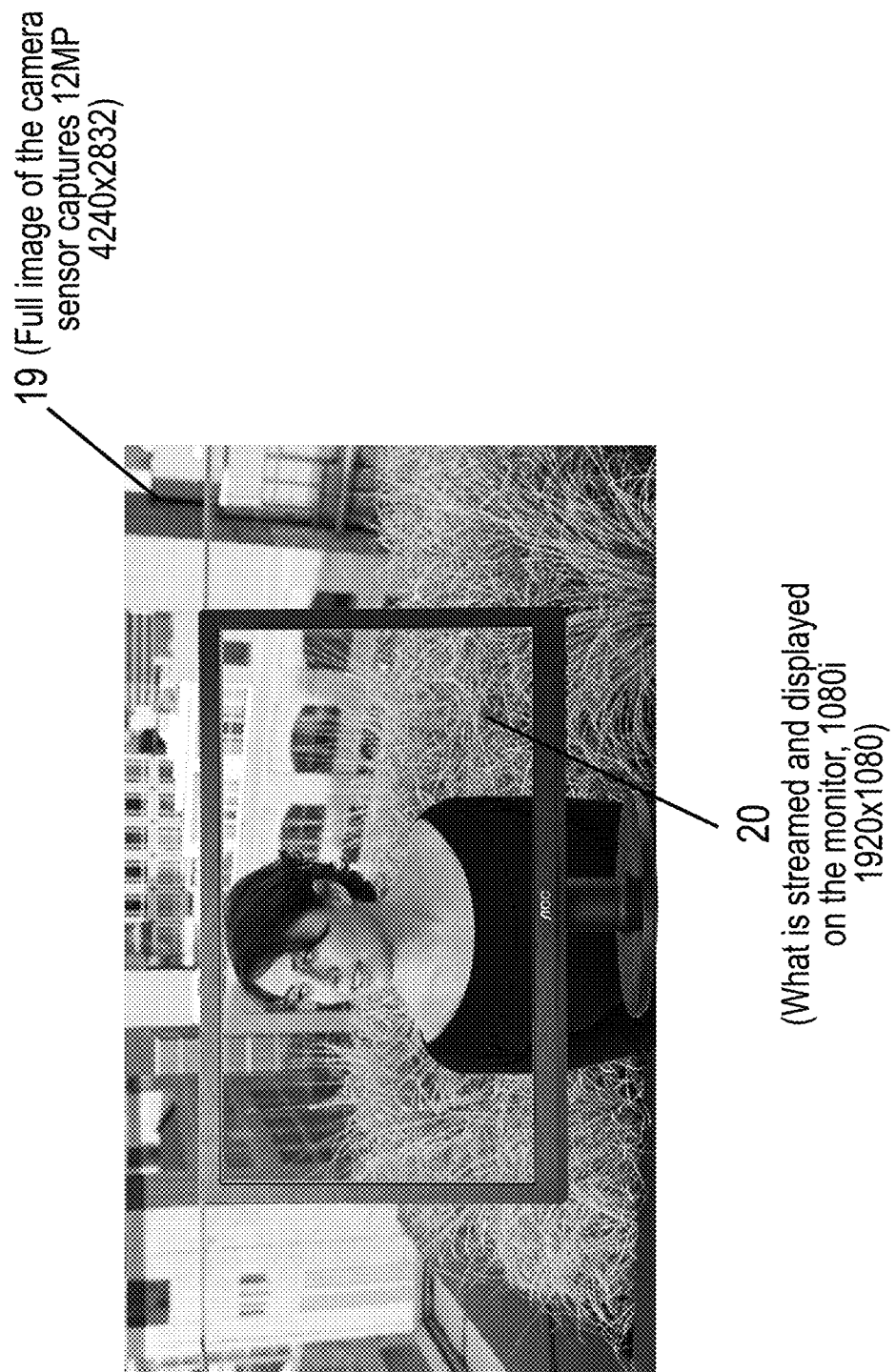
FIGS. 2-4 show an example of image manipulation on a monitor in accordance with an example embodiment of the present invention.
Figure 3:
Figure 4:

The present invention leverages the difference between the camera sensor size and normal video resolution in order to provide features such as pan and zoom and corresponding emulated images. Typically, camera sensor size is much higher than normal video resolution. For example, an iPhone camera sensor is 12 MP (4240×2832 pixels), and normal HD video only needs 1920×1080 pixel resolution. With the present invention, without sending a lower picture quality, only a portion of the image needs to be used. As shown for example in FIGS. 2-4, the camera 10 may capture a 12 MP image 19, but only a portion (1920×1080) of the image 20 is streamed to and displayed on the monitor 14. If, for example, a command to pan to the right is sent to the camera 10, the image displayed on the monitor 14 will at first be an emulated image in which the previous image is offset to the left, with a right-hand portion of the screen in black, as shown in FIG. 3. The right-hand side of the emulated image is in black since the monitor 14 has not received any data for this portion of the image (even though this was available at the camera 10 as shown in FIG. 2). Once the pan to the right command is carried out by the camera 10, the modified image is then streamed to the monitor 14 and replaces the emulated image (thus providing the missing data for the right-hand side of the image), as shown in FIG. 4. Thus, the system enables pan and zoom to be carried out over the entire sensor range of the camera 10. In other words, the original (full) image size originally captured by the camera sensor, as shown in FIG. 2, is used as the boundary for the pan and zoom commands.

In addition, there are two ways to indicate the actual stream arrival after command execution by the camera 10. First, a signal or other indicator can be embedded in the video stream 20 provided by the camera 10 after execution of the command. The system will turn off the emulation and display the actual image when the indicator arrives at the monitor 14. Second, a time code for the video can be sent in the control signal 18 with the command to be executed on the camera 10. The time code is then embedded in an image frame upon execution of the command by the camera 10. The emulation can then be turned off when an image frame with that time code arrives at the monitor 14.

The command may be specific to a camera type of the camera 10. In such an embodiment, the command input by the user via a user interface of the control device 12 may be converted into a camera-specific command based on an emulation model assigned to the camera 10. The camera specific command may be applied to a live video signal received from the camera 10 at the monitor 14 in accordance with the emulation model. The camera-specific command may be sent from the control device 12 to the camera 10 only once a user has completed adjusting the function, setting, or parameter of the camera 10. This avoids sending a command in the control signal 18 during a continuous adjustment of a parameter to avoid sending control signals for carrying out intermediate steps in an adjustment process (e.g., when zooming in on an image, the command will only be sent in the control signal when the user finishes moving the slide adjustment tool, not at any intermediate stage).

It should now be appreciated that the present invention provides advantageous methods and apparatus for remotely controlling a camera in an environment having a communication latency.

Although the invention has been described in connection with various illustrated embodiments, numerous modifications and adaptations may be made thereto without departing from the spirit and scope of the invention as set forth in the claims.

What is claimed is:

1. A method for remotely controlling a camera in an environment where there is a delay, comprising:
   providing a control device for controlling a remotely located camera via a network, the control device comprising a monitor for viewing an image provided by the camera;
   sending a control signal from the control device to the camera with a command for controlling at least one of a function, setting, or parameter of the camera;
   at least one of subsequent to sending the control signal to the camera or simultaneously therewith, modifying an image displayed on the monitor of the control device in accordance with the command to provide an emulated image for display prior to execution of the command at the camera;
   providing a time code for the command in the control signal;
   embedding the time code in an image frame upon execution of the command by the camera; and
   replacing the emulated image with the actual image from the camera once the command is executed and the image frame with the time code is received at the control device.

2. The method in accordance with claim 1, wherein each of the image and the emulated image comprises one of a still image or a video image.

3. The method in accordance with claim 1, wherein the at least one of a function, setting, or parameter of the camera comprises at least one of pan, tilt, zoom, brightness, contrast, and white balance.

4. The method in accordance with claim 1, wherein the camera comprises one of a PTZ camera, a security camera, a smart phone camera, or an IP camera.

5. The method in accordance with claim 1, wherein the control device comprises one of a dedicated hardware device, a software application running on one of a computer, a laptop computer, a tablet computer, a smart phone and an Internet enabled device, or a web page running on a web browser.

6. The method in accordance with claim 1, wherein further control signals are provided from the control device to the camera based on the emulated image.

7. The method in accordance with claim 1, wherein a sensor size of the camera is higher than a video resolution of the image.

8. The method in accordance with claim 1, wherein the command is specific to a camera type of the camera.

9. The method in accordance with claim 8, wherein:
   the command is converted into a camera-specific command based on an emulation model assigned to the camera.

10. The method in accordance with claim 9, wherein the camera specific command is applied to a live video signal received from the camera at the monitor in accordance with the emulation model.

11. The method in accordance with claim 9, wherein the camera-specific command is sent from the control device to the camera once a user has completed adjusting the function, setting, or parameter of the camera.

12. A system for remotely controlling a camera in an environment where there is a delay, comprising:
   a network;
   a remotely located camera;
   a control device for controlling the remotely located camera via the network, the control device comprising a monitor for viewing an image provided by the camera;
   the control device being adapted to send a control signal to the camera with a command for controlling at least one of a function, setting, or parameter of the camera;
   wherein:
   at least one of subsequent to sending the control signal to the camera or simultaneously therewith, the control device modifies an image displayed on the monitor in accordance with the command to provide an emulated image for display prior to execution of the command at the camera;
   a time code is provided for the command in the control signal;
   the time code is embedded in an image frame upon execution of the command by the camera; and
   the emulated image is replaced with the actual image from the camera once the command is executed and the image frame with the time code is received at the control device.

13. The system in accordance with claim 12, wherein each of the image and the emulated image comprises one of a still image or a video image.

14. The system in accordance with claim 12, wherein the at least one of a function, setting, or parameter of the camera comprises at least one of pan, tilt, zoom, brightness, contrast, and white balance.

15. The system in accordance with claim 12, wherein the camera comprises one of a PTZ camera, a security camera, a smart phone camera, or an IP camera.

16. The system in accordance with claim 12, wherein the control device comprises one of a dedicated hardware device, a software application running on one of a computer, a laptop computer, a tablet computer, a smart phone and an Internet enabled device, or a web page running on a web browser.

17. The system in accordance with claim 12, wherein further control signals are provided from the control device to the camera based on the emulated image.

18. The system in accordance with claim 12, wherein a sensor size of the camera is higher than a video resolution of the image.

19. The system in accordance with claim 12, wherein the command is specific to a camera type of the camera.

20. The system in accordance with claim 19, wherein:
   the command is converted into a camera-specific command based on an emulation model assigned to the camera.

21. The system in accordance with claim 20, wherein the camera specific command is applied to a live video signal received from the camera at the monitor in accordance with the emulation model.

22. The system in accordance with claim 20, wherein the camera-specific command is sent from the control device to the camera once a user has completed adjusting the function, setting, or parameter of the camera.

* * * * *